(12) United States Patent
McCarthy et al.

(10) Patent No.: US 8,664,582 B2
(45) Date of Patent: Mar. 4, 2014

(54) DISPLAY WITH AN OPTICAL SENSOR

(75) Inventors: John P. McCarthy, Pleasanton, CA (US); John J. Briden, San Francisco, CA (US); Bradley Neal Suggs, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 161 days.

(21) Appl. No.: 13/259,529

(22) PCT Filed: Oct. 12, 2009

(86) PCT No.: PCT/US2009/060398
§ 371 (c)(1),
(2), (4) Date: Sep. 23, 2011

(87) PCT Pub. No.: WO2011/046541
PCT Pub. Date: Apr. 21, 2011

(65) Prior Publication Data
US 2012/0018625 A1    Jan. 26, 2012

(51) Int. Cl.
*H01J 40/14* (2006.01)
(52) U.S. Cl.
USPC .......................... 250/221; 250/239
(58) Field of Classification Search
USPC .............. 250/221, 231, 239, 338.1, 339.06, 250/339.11, 341.8, 393, 554
See application file for complete search history.

(56) References Cited

U.S. PATENT DOCUMENTS

| | | | | |
|---|---|---|---|---|
| 5,525,764 | A | * | 6/1996 | Junkins et al. ............. 178/18.01 |
| 5,739,479 | A | * | 4/1998 | Davis-Cannon et al. .. 178/18.04 |
| 6,091,405 | A | | 7/2000 | Lowe et al. |
| 6,172,667 | B1 | * | 1/2001 | Sayag ............................ 345/175 |
| 6,473,069 | B1 | * | 10/2002 | Gerpheide .................... 345/157 |
| 7,181,098 | B2 | * | 2/2007 | Kwon et al. .................... 385/14 |
| 7,465,914 | B2 | * | 12/2008 | Eliasson et al. ............... 250/221 |
| 2004/0252091 | A1 | | 12/2004 | Ma et al. |
| 2007/0089915 | A1 | | 4/2007 | Ogawa et al. |
| 2008/0259052 | A1 | * | 10/2008 | Lin et al. ....................... 345/175 |
| 2009/0237376 | A1 | * | 9/2009 | Bridger ......................... 345/175 |

FOREIGN PATENT DOCUMENTS

JP    11338637    12/1999

OTHER PUBLICATIONS

International Searching Authority, International Search Report and Written Opinion, Appln No. PCT/US2009/060398, date of mailing Jul. 13, 2010, 10 p.

* cited by examiner

*Primary Examiner* — Que T Le
*Assistant Examiner* — Carolynn A Moore
(74) *Attorney, Agent, or Firm* — Reed Joseph Hablinski

(57) ABSTRACT

A display system can include a transparent layer. The transparent layer can include a front and a back. A bevel region can extend from the transparent layer. A panel can be on the back of the transparent layer. A three dimensional optical sensor can be on the back of the bevel region.

20 Claims, 7 Drawing Sheets

DISPLAY WITH AN OPTICAL SENSOR

BACKGROUND

A resistive touch screen panel is composed of two thin, metallic, electrically conductive layers separated by a narrow gap. When an object, such as a finger, presses down on a point on the panel's outer surface the two metallic layers become connected at that point and the panel then behaves as a pair of voltage dividers with connected outputs. This causes a change in the electrical current which is registered as a touch event and sent to the controller for processing. A capacitive touch screen panel is a sensor that is a capacitor in which plates include overlapping areas between the horizontal and vertical axes in a grid pattern. The human body also conducts electricity and a touch on the surface of the sensor will affect the electric field and create a measurable change in the capacitance of the device.

BRIEF DESCRIPTION OF THE DRAWINGS

Some embodiments of the invention are described with respect to the following figures.

DETAILED DESCRIPTION

Figure 1A:
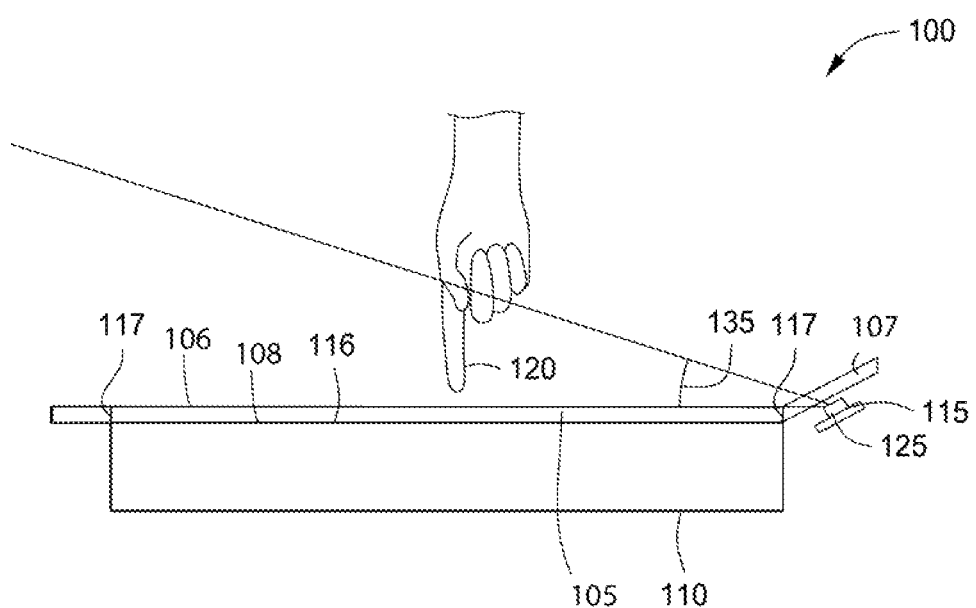
FIG. 1a is a display according to an exemplary embodiment of the invention.

A graphical user interface (GUI) can use a pointing device such as a mouse to move a cursor to an object on the display. In one embodiment the display includes a three dimensional optical sensor to determine the depth an object that is captured by the optical sensor is from the optical sensor. The distance the object is from the display can be calculated from the distance the object is from the optical sensor.

The resistive touch screen panel includes a glass panel that is covered with a conductive and a resistive metallic layer. These two layers are held apart by spacers, and a scratch-resistant layer is placed on top. An electrical current runs through the two layers while the display is operational. When a user touches the screen, the two layers make contact in that exact spot. The change in the electrical field is noted and the coordinates of the point of contact are calculated by the computer. In a capacitive system, a layer that stores electrical charge is placed on the glass panel of the display. When a user touches the display with their finger, some of the charge is transferred to the user, so the charge on the capacitive layer decreases. This decrease is measured in circuits located at each corner of the display. The layers covering the glass panels reduce the amount of light that travels thought the glass layer from the display panel to the user and degrades the optical clarity of the image.

Two dimensional optical touch systems may be used to determine where on a screen a touch occurs. A two dimensional optical touch system may include a light source that travels across the surface of the display and is received at the opposite side of the display. If an object interrupts the light then the receiver does not receive the light and a touch is registered at the location where light from two sources that are interrupted intersect. The light source and the receiver in an optical touch system are mounted in front of the transparent layer to allow the beams to travel along the surface of the transparent layer. Some optical sensors appear as a small wall around the perimeter of the display. Mounting the light sources and receivers in front of the glass allows contaminants to interfere with the light that is transmitted between the source and the receivers. The contaminants can be for example dust or dirt.

In one embodiment, a display system can include a transparent layer. The transparent layer can include a front and a back. A bevel region can extend from the transparent layer. A panel can be on the back of the transparent layer. The panel can display images on the front side. A three dimensional optical sensor can be on the back of the bevel region. The bevel region may allow the three dimensional optical sensor to have a field of view that travels across the surface of the transparent layer. The bevel region may also reduce the amount of light that is used by changing the angle that the light is captured by the three dimensional optical sensor.

Referring to the figures, FIG. 1a is a display system 100 according to an exemplary embodiment of the invention. The display system 100 includes a panel 110 and a transparent layer 105 in front of the surface 116 of the panel 110 for displaying images. The front of the panel 110 is the surface 116 that displays an image and the back of the panel 110 is opposite the front. The transparent layer 105 can be glass, plastic, or another transparent material. The panel 110 may be a liquid crystal display (LCD) panel, a plasma display, a cathode ray tube (CRT), an OLED or a projection display such as digital light processing (DLP), for example. Mounting the three dimensional optical sensors in an area of the display system 100 that is outside of the perimeter 117 of the surface 116 of the panel 110 provides that the clarity of the transparent layer is not reduced by the three dimensional optical sensor.

Extending from the transparent layer can be a bevel region 107. The bevel region 107 is a region that has at least one surface that is not parallel to the surface of the transparent layer 105. In one embodiment the front 109 and the back 111 of the bevel region 107 are both not parallel to the front surface 106 and back surface 108 of the transparent layer 105. In one embodiment the bevel region 107 is opaque to visible light and transparent to an invisible light frequency range. For example the bevel region may not allow the user to see what is behind the bevel region but the infrared light may be able to pass through the bevel region and be captured by the three dimensional optical sensor 115. In one embodiment, the bevel region 107 is one piece with the transparent layer 105 or the bevel region is separate and is attached to the transparent layer 105. The bevel region 107 can be outside of the perimeter 117 of the panel 110.

In one embodiment the bevel region can allow the three dimensional optical sensor to have a field of view that is parallel with the surface of the transparent layer to capture the reflections of a light source that passes through the bevel region 107. If the bevel region was not beveled and was parallel to the transparent layer the light captured by the three dimensional optical sensor 115 may have to travel from a first end of the panel 110 to the second end of the panel 110 through the transparent layer 105. If the light were to enter the transparent layer 105 a portion of the light may be refracted and a portion of the light may be reflected determined by the angle that the light enters the surface of the transparent layer 105. The angle that the light enters the surface is the incidence angle. The incidence angle is the angle between the normal angle, perpendicular to the surface of the bevel region or transparent layer and the light entering the surface of the bevel region or the transparent layer. The angle of the bevel region relative to the surface of the transparent layer can affect the incidence angle of the light entering the surface of the bevel region and the light transmitted to the three dimensional optical sensor. For example the incidence angle for light reflecting off of the object 120 at a location the object contacts the surface of the transparent layer may be about 90 degrees to the transparent layer 105 as the light reflected by the object that is captured by the three dimensional optical sensor travels about parallel to the surface of the transparent layer but a light reflected off of the object 120 at a location the object contacts the surface of the transparent layer may be less than 90 degrees by the number of degrees that the bevel region 107 is beveled relative to the transparent layer 105. As the incident angle approaches the normal line less light is reflected and more light is refracted by the bevel region and the refracted light is captured by the three dimensional optical sensor 115. If more light is captured by the sensor because of the angle of the beveled region 107 the output of the light source may be adjusted for efficiency. The three dimensional optical sensor 115 can determine the depth from the three dimensional optical sensor of an object located in the field of view 135 of the three dimensional optical sensor 115. The depth of the object can be used in one embodiment to determine if the object is in contact with the display. The depth of the object can be used in one embodiment to determine if the object is within a programmed distance of the display but not contacting the display. For example the object 120 may be a user's hand and finger approaching the transparent layer 105.

If the object 120 is within the field of view 135 of the three dimensional optical sensor 115, light from the light source 125 can reflect from the object and be captured by the three dimensional optical sensor 115. The distance the object 120 is from the three dimensional optical sensor 115 can be used to determine the distance the object is from the display system 100.

Figure 1B:
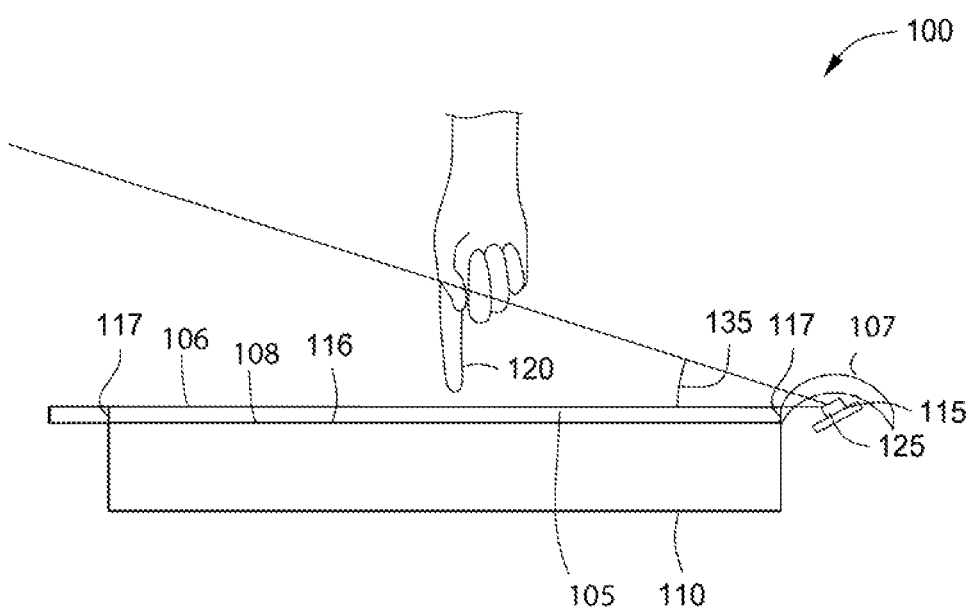
FIG. 1b is a display according to an exemplary embodiment of the invention.

FIG. 1b is a display 100 according to an exemplary embodiment of the invention. The display 100 can include a bevel region 107 extending from the transparent layer 105. In one embodiment the bevel region is a dome extending from the transparent layer. In another embodiment the bevel is a dome and is attached to a bezel that surrounds the transparent layer 105. The bezel can be the area of the transparent layer outside of the perimeter 117 of the panel 110 or can be separate from the transparent layer 105.

Figure 2:
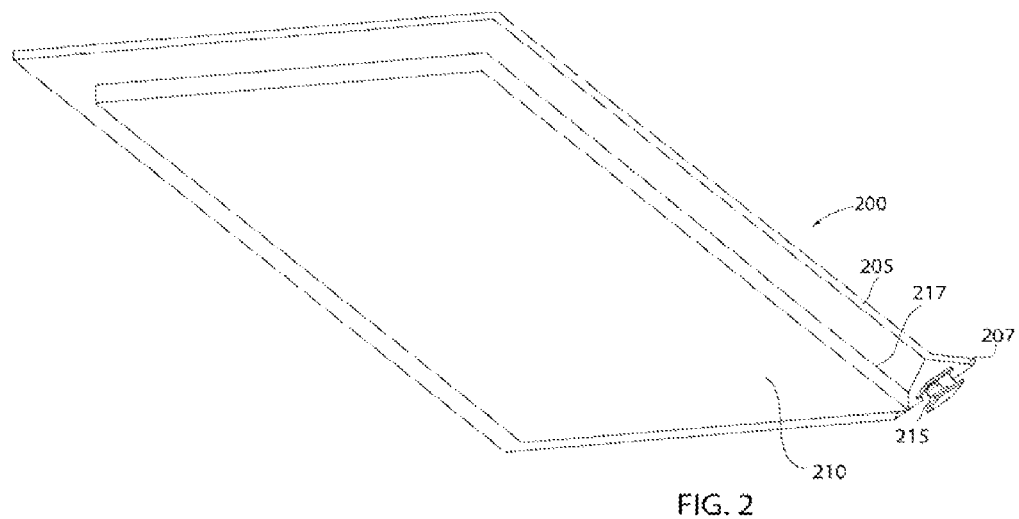
FIG. 2 is a portion of the display according to an exemplary embodiment of the invention.

FIG. 2 is a portion of the display 200 according to an exemplary embodiment of the invention. The portion of the display 200 includes a three dimensional optical sensor 215 mounted behind a bevel region 207. The bevel region 207 can extend from the transparent layer 205. The angle of the three dimensional optical sensor is determined so that the field of view of the three dimensional optical sensor 215 includes the portion of the transparent layer 205 corresponding to a perimeter 217 of the display panel 210. The field of view can be determined by the lens on the three dimensional optical sensor 215. The field of view may be measured in degrees, for example the three dimensional optical sensor that has a field of view of 100 degrees can capture images that a three dimensional optical sensor with a field of view of 50 degrees would not capture. In this embodiment the bevel region is extends from a corner of the transparent layer 105 but the bevel region may be an extended portion of the transparent layer 205 that is outside of the perimeter 217 of the display panel 210 including any of the area that is beyond the perimeter of 217 of the display panel 210.

Figure 3:
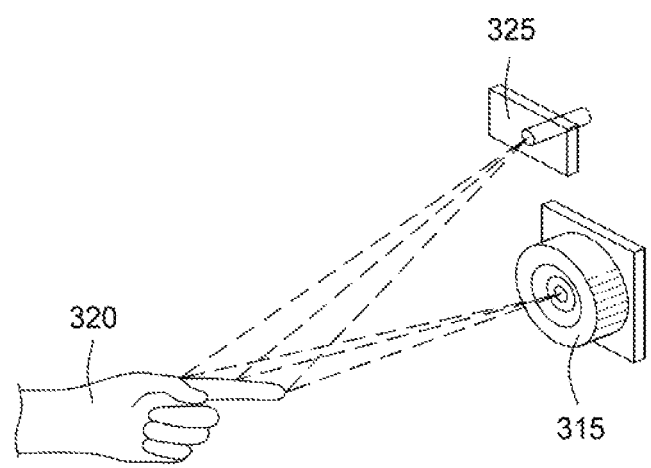
FIG. 3 is a three dimensional optical sensor according to an exemplary embodiment of the invention.

FIG. 3 is a three dimensional optical sensor 315 according to an exemplary embodiment of the invention. The three dimensional optical sensor 315 can receive light from a source 325 reflected from an object 320. The light source 325 may be for example an infrared light or a laser light source that emits light that is invisible to the user. The light source 325 can be in any position relative to the three dimensional optical sensor 315 that allows the light to reflect off the object 320 and be captured by the three dimensional optical sensor 315. The infrared light can reflect from an object 320 that may be the user's hand, in one embodiment and is captured by the three dimensional optical sensor 315. An object in a three dimensional image is mapped to different planes giving a Z-order, order in distance, for each object. The Z-order can enable a computer program to distinguish the foreground objects from the background and can enable a computer program to determine the distance the object is from the display.

Two dimensional sensors that use a triangulation based method such as stereo may involve intensive image processing to approximate the depth of objects. The two dimensional image processing uses data from a sensor and processes the data to generate data that is normally not available from a two dimensional sensor. Intensive image processing may not be used for a three dimensional sensor because the data from the three dimensional sensor includes depth data. For example, the image processing for a time of flight three dimensional optical sensor may involve a simple table-lookup to map the sensor reading to the distance of an object from the display. The time of flight sensor determines the depth from the sensor of an object from the time that it takes for light to travel from a known source, reflect from an object and return to the three dimensional optical sensor. The depth of an object in the image can be determined from the three dimensional optical sensor that does not use a second three dimensional optical sensor to determine the distance of the object in the image.

In an alternative embodiment the light source can emit structured light that is the projection of a light pattern such as a plane, grid, or more complex shape at a known angle onto an object. The way that the light pattern deforms when striking surfaces allows vision systems to calculate the depth and surface information of the objects in the scene. Integral Imaging is a technique which provides a full parallax stereoscopic view. To record the information of an object, a micro lens array in conjunction with a high resolution optical sensor is used. Due to a different position of each micro lens with respect to the imaged object, multiple perspectives of the object can be imaged onto an optical sensor. The recorded image that contains elemental images from each micro lens can be electronically transferred and then reconstructed in image processing. In some embodiments the integral imaging lenses can have different focal lengths and the object's depth is determined based on if the object is in focus, a focus sensor, or out of focus, a defocus sensor. The embodiments of the invention are not limited to the type of three dimensional optical sensors that have been described but may be any type of three dimensional sensor.

Figure 4:
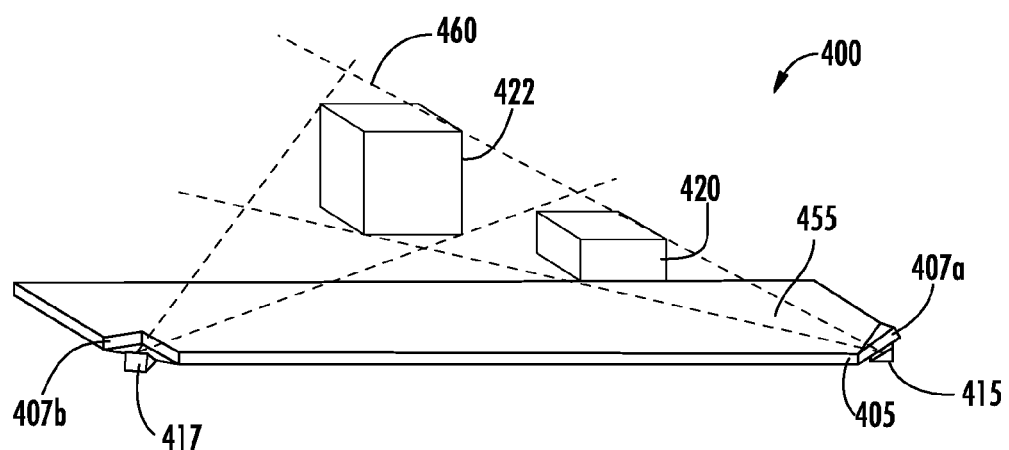
FIG. 4 is a display according to an exemplary embodiment of the invention.

FIG. 4 is a display according to an exemplary embodiment of the invention. In some GUIs a display system 400 that can sense more than one object 420 may be able to perform tasks within a program that would not be recognized by a single contact. For example, moving two fingers apart may zoom in on an item and moving two fingers together may zoom out on an item.

In one embodiment, there is a first three dimensional optical sensor 415 and a second three dimensional optical sensor 417. The first three dimensional optical sensor 415 can be behind the first beveled region 407a and the second three dimensional optical sensor 417 can be behind the second beveled region 407b. The beveled regions 407a and 407b can be in the corners of the transparent layer 405 or may extend from any part of the transparent layer 405. The first three dimensional optical sensor 415 may have a field of view 460. Within the field of view 460 an image of object 420 is captured. A second object 422 cannot be seen by the first three dimensional optical sensor 415 because the first object 420 is between the first three dimensional optical sensor 415 and the second object 422. The field of view can include view 455 that is obstructed by the first object 420 along the portion 455 of the field of view beyond the first object 420. The second three dimensional optical sensor 417 can capture within its field of view an image including the depth of both the first object 420 and the second object 422. The first three dimensional optical sensor 415 can determine the distance of a first object 420, for example a user's finger. The first three dimensional optical sensor 415 may not be able to capture a second object 422, for example a finger on a user's other hand if the view by the first three dimensional optical sensor 415 of the second object 422 is obstructed by a the first object 420. The first three dimensional optical sensor 415 and the second three dimensional optical sensor 417 may be in the corners of the display system 400 or the optical sensors may be located anywhere in or on the display such as the top, bottom, or sides.

A three dimensional optical sensor can be used to determine the size of objects because the depth from the optical sensor is known. If the depth from the optical sensor is not known the image of an object 420 may appear the same as a larger object 422 that is further away from the optical sensor 415. The size of the object may be used by the computing system to determine the type of object, such as a hand, finger, pen, or another object.

Figure 5:
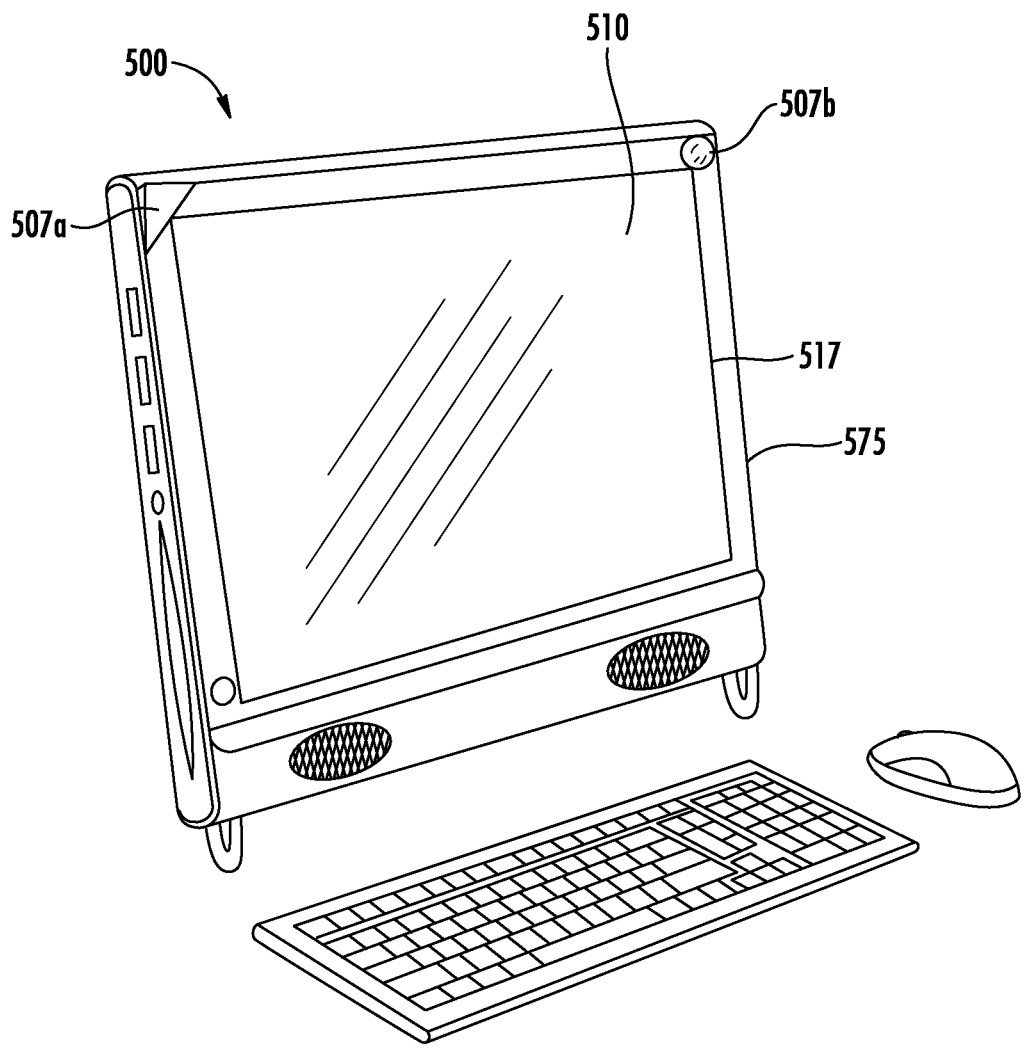
FIG. 5 is a display according to an exemplary embodiment of the invention.

FIG. 5 is a display according to an exemplary embodiment of the invention. The three dimensional optical sensor has a viewable area that extends beyond the perimeter 517 of the display panel 510. The movement of objects beyond the perimeter 517 can activate functions of a computer system. The bevel region 507a can allow the three dimensional optical sensor behind the bevel region 507a to have a field of view including beyond the side 575 of the display system 500. In one embodiment the bevel region is a dome 507b extending from the transparent layer in front of the panel 510. The three dimensional optical sensor is behind the bevel region 507a and 507b.

Figure 6:
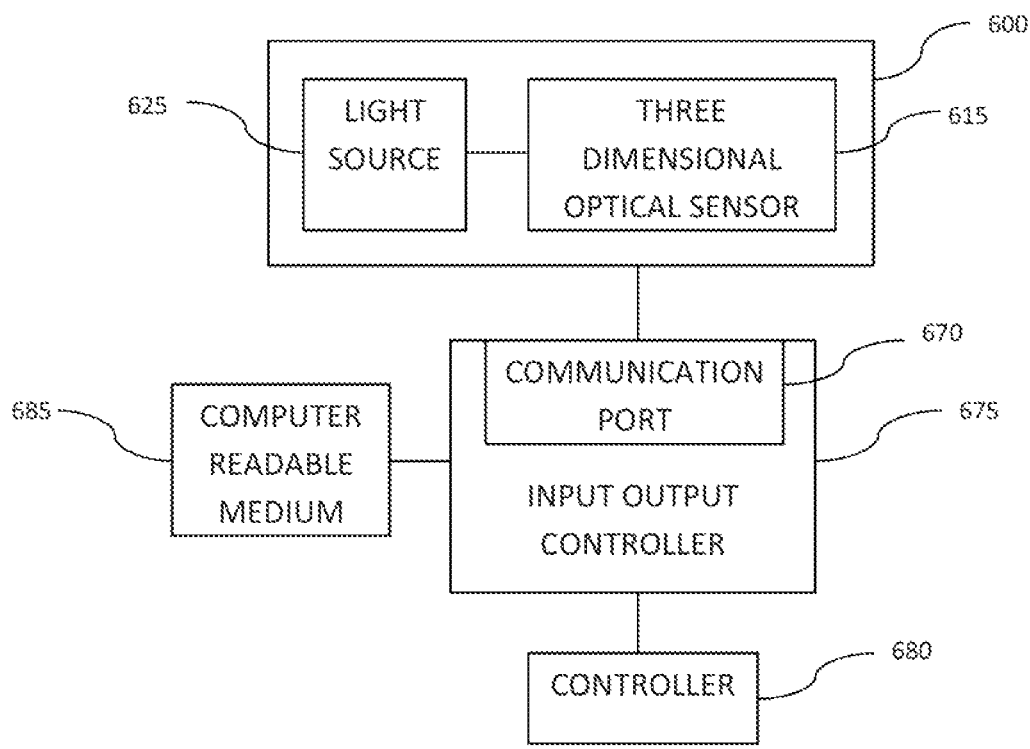
FIG. 6 is a block diagram according to an exemplary embodiment of the invention.

FIG. 6 is a block diagram according to an exemplary embodiment of the invention. The optical sensor module 600 includes the light source 625 and the optical sensor 615. The optical sensor module 600 can capture data that may include height, width, and depth of an object in an image. The optical sensor module 600 can connect to a communication port 670 to transmit captured data to a computing device. The communication port 670 can be a communication port 670 on a computing device. For example the communication port 670 can be a universal serial bus (USB) port or an IEEE 1394 port. The communication port 670 may be part of the input output controller 675 of the computing device, in one embodiment. The input output controller 675 can be connected to a computer readable medium 685. The input output controller 675 of a computing device can connect to a controller 680.

The controller 680 can receive data captured by the three dimensional optical sensor module 625 through the communication port 670 of the input output controller 675. The controller 680 can determine from the data captured by the three dimensional optical sensor module 600 the distance an object is from the optical sensor module 600. The controller 680 can determine the distance the object is from a display based on the distance the object is from the three dimensional optical sensor module 600. In one embodiment, the controller 680 is a processor or an application specific integrated circuit (ASIC).

Figure 7:
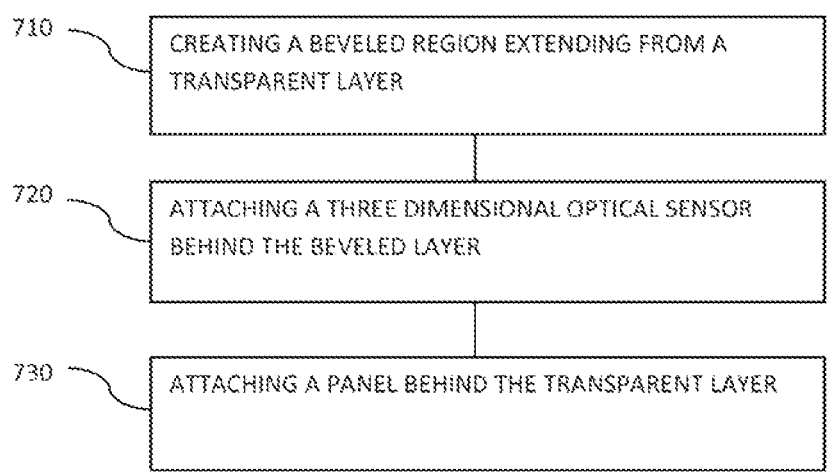
FIG. 7 is a flow diagram according to an exemplary embodiment of the method of the invention.

FIG. 7 is a flow diagram according to an exemplary embodiment of the method of the invention. The method begins by creating a beveled region extending from a transparent layer (at 710). A three dimensional optical sensor can be attached behind the beveled region (at 720). A panel can be attached behind the transparent layer (at 730). The panel can include a surface that displays images and the images displayed can be visible through the transparent layer.

In one embodiment, the beveled region is transparent to infrared wavelengths and is opaque to visible wavelengths. The visible wavelength may be approximately from 380 nm to 750 nm. If the beveled region is transparent to infrared wavelengths and opaque to visible wavelengths, a user would not be able to view any components behind the beveled region and the three dimensional optical sensor can still receive infrared light reflected off of objects. In one embodiment the light source is attached behind the beveled region.

In one embodiment the beveled region includes a beveled back surface relative to the transparent layer back surface while the front surface of the beveled region is parallel to the front surface of the transparent layer. In one embodiment, the beveled region can include a beveled front surface relative to the transparent layer front surface. If the front surface of the beveled regions is beveled relative to the front surface of the transparent layer, the field of view of the three dimensional optical sensor can be aligned with a front surface of a transparent layer.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A display system comprising:
   a transparent layer including a front and a back and a bevel region extending from the transparent layer, wherein the bevel region includes a front and a back;
   a panel on the back of the transparent layer; and
   a three dimensional optical sensor on the back of the bevel region.

2. The system of claim 1 further comprising a second three dimensional optical sensor to determine a depth from the second three dimensional optical sensor of the object located in a field of view of the second three dimensional optical sensor.

3. The system of claim 1 wherein the bevel region is dome shaped.

4. The system of claim 1 wherein the three dimensional optical sensor is attached outside of a perimeter of the panel.

5. The system of claim 4 wherein the bevel region is outside the perimeter of the panel.

6. The system of claim 1 wherein the three dimensional optical sensor is selected from the group consisting of a time of flight sensor, a structured light sensor, focus sensor, and a defocus sensor.

7. The system of claim 1, wherein the bevel region extends from an edge of the transparent layer outside a perimeter edge of the layer.

8. The system of claim 1, wherein the bevel region has a front face oblique to and contiguous with a face of the front of the transparent layer.

9. The system of claim 1, wherein the bevel region extends at an obtuse angle with respect to the front of the transparent layer.

10. The system of claim 1, wherein the panel has a rectangular viewing area having four corners and wherein the bevel region is outside the rectangular viewing area.

11. The system of claim 10, wherein the bevel region is at a first corner of the four corners and faces a second corner of the four corners diagonal to the first corner.

12. A method comprising:
creating a beveled region extending from a transparent layer;
attaching a three dimensional optical sensor behind the beveled region; and
attaching a panel behind the transparent layer.

13. The method of claim 12 wherein the beveled region is transparent to infrared wavelengths.

14. The method of claim 13, wherein the beveled region is opaque to visible wavelengths.

15. The method of claim 12 further comprising generating depth information from a group consisting of time of flight information, structured light information, focus depth information and defocus depth information.

16. The method of claim 12 wherein the beveled region includes a beveled back surface relative to the transparent layer back surface.

17. The method of claim 12 wherein the beveled region includes a beveled front surface relative to the transparent layer front surface.

18. The method of claim 12 further comprising aligning the field of view of the three dimensional optical sensor with a front surface of a transparent layer.

19. The method of claim 12 further comprising attaching a light source behind the beveled region to emit light through the beveled region.

20. A display system comprising:
a panel to display images on a front side;
a three dimensional optical sensor to determine depth from the three dimensional optical sensor of an object located in a field of view of the three dimensional optical sensor;
a transparent layer including a front, a back in front of the front side of the panel and a side; and
a beveled region extends from the transparent layer in front of the three dimensional optical sensor.

* * * * *